US012718379B2

(12) United States Patent
Mendelowitz

(10) Patent No.: US 12,718,379 B2
(45) Date of Patent: Aug. 25, 2026

(54) SYSTEMS AND METHODS FOR GENERATING AND DEFORMING A SPATIAL TEMPLATE TO IDENTIFY LANDMARKS

(71) Applicant: Toyota Jidosha Kabushiki Kaisha, Toyota (JP)

(72) Inventor: Eitan Gilad Mendelowitz, Northampton, MA (US)

(73) Assignee: Toyota Jidosha Kabushiki Kaisha, Toyota Aichi-ken (JP)

( * ) Notice: Subject to any disclaimer, the term of this patent is extended or adjusted under 35 U.S.C. 154(b) by 382 days.

(21) Appl. No.: 18/425,137

(22) Filed: Jan. 29, 2024

(65) Prior Publication Data

US 2025/0245837 A1 Jul. 31, 2025

(51) Int. Cl.
*G06T 7/149* (2017.01)
*G06V 20/58* (2022.01)

(52) U.S. Cl.
CPC ............ *G06T 7/149* (2017.01); *G06V 20/582* (2022.01); *G06V 20/584* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS 11,774,251 B2 * 10/2023 Shashua ................. G01C 21/30 701/423
2013/0216141 A1 8/2013 Ushiba et al.
2017/0193699 A1 7/2017 Mehr et al.
2019/0139231 A1 5/2019 Aizawa
2019/0325236 A1 * 10/2019 Zaba ...................... G06N 20/00
2020/0398855 A1 * 12/2020 Thompson ............. G01C 21/30
2021/0335039 A1 10/2021 Jones et al.
2022/0138980 A1 5/2022 Lachner et al.
2023/0150530 A1 * 5/2023 Chiu ...................... G06V 20/56 701/23
2023/0236038 A1 7/2023 Hayashi et al.

OTHER PUBLICATIONS

Zhong et al., "Object Tracking Using Deformable Templates," in IEEE Transactions on Pattern Analysis and Machine Intelligence, vol. 22, No. 5, May 2000, pp. 544-549.

(Continued)

*Primary Examiner* — Thomas D Lee

(74) *Attorney, Agent, or Firm* — Christopher G. Darrow; Darrow Mustafa PC

(57) ABSTRACT

Systems, methods, and other embodiments described herein relate to identifying landmarks by generating and deforming a spatial template using trace data from multiple vehicles. In one embodiment, a method includes forming a trace dataset for multiple vehicles from locations of landmarks and vehicles identified with sensor data by a learning model, the sensor data associated with the multiple vehicles. The method also includes generating a spatial template by a vehicle using the trace dataset having missing data. The method also includes aligning the landmarks for positioning by deforming the spatial template using a spring model that fills the missing data.

20 Claims, 5 Drawing Sheets

(56) References Cited

OTHER PUBLICATIONS

Ben Kenwright, "Scalable Real-Time Vehicle Deformation for Interactive Environments," arXiv:2304.05045, Apr. 11, 2023, pp. 1-6.
Rastgoftar et al., "Scalable Vehicle Team Continuum Deformation Coordination with Eigen Decomposition," in IEEE Transactions on Automatic Control, vol. 67, No. 5, May 2022, pp. 2514-2521.
Greer et al., "Robust Traffic Light Detection Using Salience-Sensitive Loss: Computational Framework and Evaluations," arXiv:2305.04516, May 8, 2023, pp. 1-7.
Jolly et al., "Vehicle segmentation and classification using deformable templates," in IEEE Transactions on Pattern Analysis and Machine Intelligence, vol. 18, No. 3, Mar. 1996, pp. 293-308.
Ferman et al., "Generative Landmarks," arXiv:2104.04055, Apr. 8, 2021, 2 pages.
Lamarca et al., "Direct and Sparse Deformable Tracking," in IEEE Robotics and Automation Letters, vol. 7, No. 4, Oct. 2022, pp. 11450-11457.
Hofhauser et al., "Edge-Based Template Matching with a Harmonic Deformation Model," VISIGRAPP 2008, Communications in Computer and Information Science, vol. 24, pp. 1-12.
Jain et al., "Object Matching Using Deformable Templates," in IEEE Transactions on Pattern Analysis and Machine Intelligence, vol. 18, No. 3, Mar. 1996, pp. 267-278.

* cited by examiner

SYSTEMS AND METHODS FOR GENERATING AND DEFORMING A SPATIAL TEMPLATE TO IDENTIFY LANDMARKS

TECHNICAL FIELD

The subject matter described herein relates, in general, to identifying landmarks on a road, and, more particularly, to identifying landmarks by generating and deforming a spatial template using sensor data.

BACKGROUND

Vehicles can be equipped with sensors generating data that facilitate perceiving other vehicles, obstacles, pedestrians, and additional aspects of a surrounding environment. For example, a vehicle uses data from a light detection and ranging (LIDAR) sensor to scan the surrounding environment for landmarks (e.g., traffic lights, stop signs, etc.). Meanwhile logic associated with the LIDAR analyzes acquired data to localize and detect landmarks by extracting features. In further examples, cameras acquire data about the surrounding environment from which a system derives awareness about aspects of the surrounding environment that includes the landmarks. This sensor data can be useful in various circumstances for improving perceptions of the surrounding environment so that systems such as automated driving systems (ADS) can perceive the noted aspects and accurately navigate accordingly.

In general, the further awareness is developed by the vehicle about a surrounding environment, the better an operator can be supplemented with information to assist in driving and/or the better an ADS can control the vehicle for hazard avoidance. However, the sensor data about landmarks can vary between vehicles. For example, multiple vehicles located and positioned at different points at an intersection estimate a location of a traffic light with an offset. As such, safety decreases for an ADS that relies on the location while crossing the intersection due to uncertainty from the offset. Therefore, vehicles can encounter difficulties navigating a road safely when using sensor data to locate and detect landmarks.

SUMMARY

In one embodiment, example systems and methods relate to identifying landmarks by generating and deforming a spatial template using trace data from multiple vehicles. In various implementations, systems controlling vehicles with an automated driving system (ADS) identify and log locations of landmarks (e.g., obstacles, trees, traffic lights, stop signs, buildings, etc.) using data acquired from sensors. However, these systems may identify landmarks with notable discrepancies due to relative locations and varying views of the vehicles. Furthermore, systems overlook landmarks when a vehicle blocks or obstructs the view of another vehicle, thereby causing a hazard for tasks that rely on landmark positions.

Therefore, in one embodiment, an identification system associates landmark locations using sensor data from multiple vehicles and fills in missing data for identifying landmarks. Here, a learning model (e.g., a neural network) can process sensor data from a vehicle to form a trace having estimated landmark and vehicle locations within a relative space. In this way, a certain vehicle can form a trace dataset of traces acquired from multiple vehicles and identify landmarks. In one approach, the identification system generates a spatial template using the trace dataset to estimate the shapes of the landmarks and improve landmark positioning within a driving scene. Furthermore, the identification system deforms (e.g., compresses, expands, twists, etc.) the spatial template using a spring model that fills the missing data, mitigates location discrepancies, and aligns landmarks through shifting locations captured within the trace dataset. As such, the identification system accurately locates and positions the landmarks by aligning the landmarks through deforming the spatial template while maintaining spatial relationships. Accordingly, vehicles can improve positioning accuracy of landmarks with the identification system generating and deforming a spatial template using a spring model, thereby increasing vehicle performance and safety through increasingly reliable maps.

In one embodiment, an identification system for identifying landmarks by generating and deforming a spatial template using trace data from multiple vehicles is disclosed. The identification system includes a memory storing instructions that, when executed by a processor, cause the processor to form a trace dataset for multiple vehicles from locations of landmarks and vehicles identified with sensor data by a learning model, the sensor data associated with the multiple vehicles. The instructions also include instructions to generate a spatial template by a vehicle using the trace dataset having missing data. The instructions also include instructions to align the landmarks for positioning by deforming the spatial template using a spring model that fills the missing data.

In one embodiment, a non-transitory computer-readable medium for identifying landmarks by generating and deforming a spatial template using trace data from multiple vehicles and including instructions that when executed by a processor cause the processor to perform one or more functions is disclosed. The instructions include instructions to form a trace dataset for multiple vehicles from locations of landmarks and vehicles identified with sensor data by a learning model, the sensor data associated with the multiple vehicles. The instructions also include instructions to generate a spatial template by a vehicle using the trace dataset having missing data. The instructions also include instructions to align the landmarks for positioning by deforming the spatial template using a spring model that fills the missing data.

In one embodiment, a method for identifying landmarks by generating and deforming a spatial template using trace data from multiple vehicles is disclosed. In one embodiment, the method includes forming a trace dataset for multiple vehicles from locations of landmarks and vehicles identified with sensor data by a learning model, the sensor data associated with the multiple vehicles. The method also includes generating a spatial template by a vehicle using the trace dataset having missing data. The method also includes aligning the landmarks for positioning by deforming the spatial template using a spring model that fills the missing data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
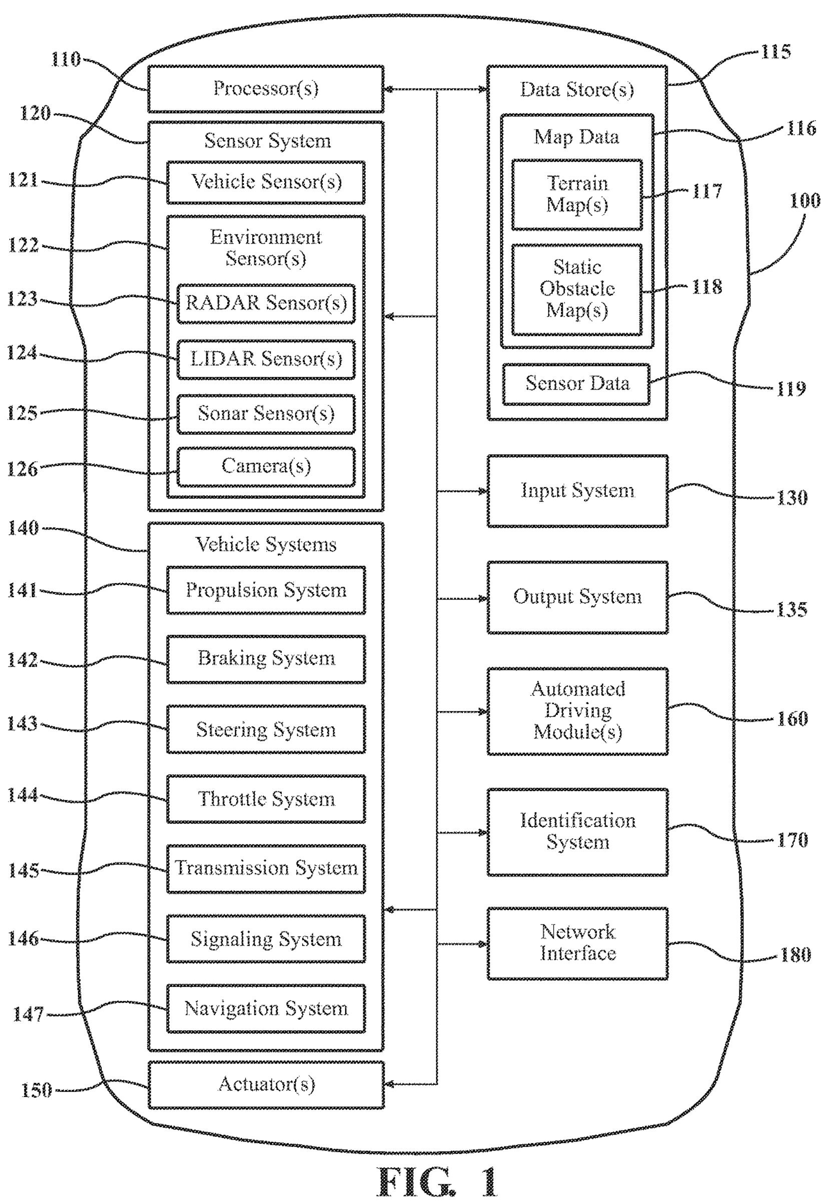
FIG. 1 illustrates one embodiment of a vehicle within which systems and methods disclosed herein may be implemented.

Systems, methods, and other embodiments associated with identifying landmarks by generating and deforming a spatial template using trace data from multiple vehicles are disclosed herein. In various implementations, systems that estimate landmark (e.g., obstacles, trees, traffic lights, stop signs, buildings, etc.) positions from sensor data of a vehicle using a learning model for mapping encounter difficulties. The sensor data can include data errors, signal offsets, and information inconsistencies. As such, position discrepancies are found when comparing estimates from multiple vehicles, thereby reducing mapping reliability. Furthermore, systems performing tasks within the vehicle that demand landmark positions having sufficient accuracy face difficulties due to localization discrepancies.

Therefore, in one embodiment, an identification system deforms a spatial template generated using a trace dataset formed with sensor data acquired from multiple vehicles to connect and associate landmark locations for identification. In one approach, a learning model (e.g., a neural network) estimates landmark and vehicle locations with the sensor data and communicates the estimates to form the trace dataset. Furthermore, the identification system may use a spring model that fills missing contours and edges of landmarks within the spatial template and aligns the landmarks by deformations (e.g., compressions, expansions, twisting, etc.) in multiple dimensions for landmark positioning. For example, the spring model executes probabilistic transformations to estimate the elasticity and dynamics of landmark locations within a scene, such as through shifting, thereby improving positioning and alignment predictions. In this way, the identification system reduces discrepancies for landmark locations estimated from the sensor data, thereby improving the reliability of landmark positions and related tasks.

In various implementations, the identification system aligns the landmarks with the spatial template through relating landmark locations using individual traces from the trace dataset. Here, a trace can be specific to a vehicle and formed from landmark and vehicle locations that are identified using the learning model with the sensor data. In one approach, the trace includes keypoints of object features within a scene derived from the sensor data. For alignment and positioning, the identification system may move the landmark locations within a distance range by the spring model which increases position probability to fill missing data. As a further improvement, the identification system may relate locations by completely combining the trace dataset into the spatial template and connecting by the spring model similar landmarks for various vehicles from various trips, thereby increasing data diversity. Thus, the identification system improves the accuracy of landmark locations by deforming a spatial template, thereby increasing vehicle performance for navigation, mapping, and control tasks utilizing landmark positions.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an identification system 170 uses road-side units (RSU), consumer electronics (CE), mobile devices, robots, drones, and so on that benefit from the functionality discussed herein associated with identifying landmarks by generating and deforming a spatial template using trace data from multiple vehicles.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an identification system 170 that is implemented to perform methods and other functions as disclosed herein relating to identifying landmarks by generating and deforming a spatial template using trace data from multiple vehicles. In one approach, the identification system 170 is implemented partially within the vehicle 100, and as a cloud-based service with a cloud server, an edge server, etc. For example, functionality associated with at least one module of the identification system 170 is implemented within the vehicle 100, while further functionality is implemented within a cloud-based computing system.

Figure 2:
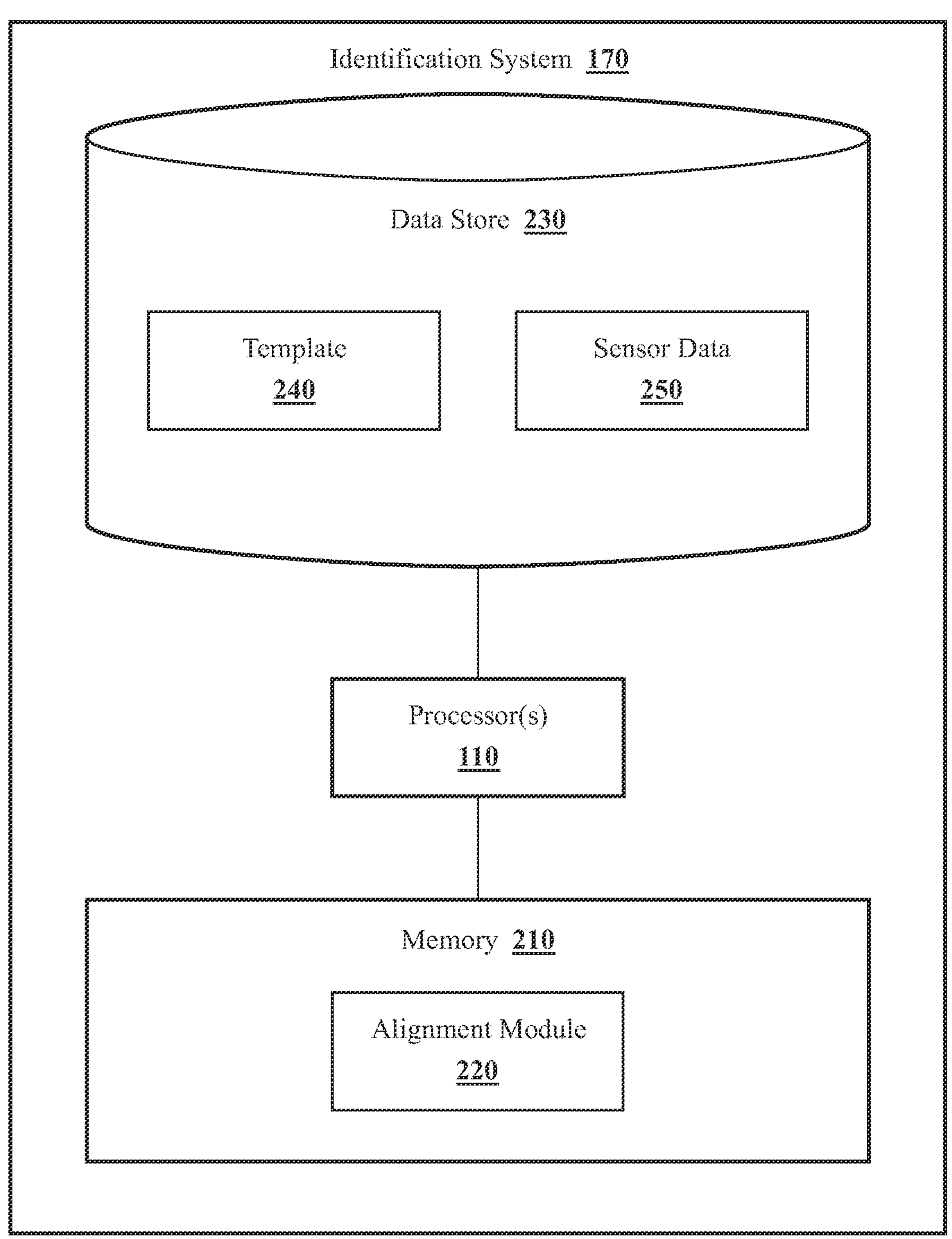
FIG. 2 illustrates one embodiment of an identification system that is associated with generating a spatial template and aligning landmarks for positioning.

With reference to FIG. 2, one embodiment of the identification system 170 of FIG. 1 is further illustrated. The identification system 170 is shown as including a processor (s) 110 from the vehicle 100 of FIG. 1. Accordingly, the processor(s) 110 may be a part of the identification system 170, the identification system 170 may include a separate processor from the processor(s) 110 of the vehicle 100, or the identification system 170 may access the processor(s) 110 through a data bus or another communication path. In one embodiment, the identification system 170 includes a memory 210 that stores an alignment module 220. The memory 210 is a random-access memory (RAM), a read-only memory (ROM), a hard-disk drive, a flash memory, or other suitable memory for storing the alignment module 220. The alignment module 220 are, for example, computer-readable instructions that when executed by the processor(s) 110 cause the processor(s) 110 to perform the various functions disclosed herein.

The identification system 170 as illustrated in FIG. 2 is generally an abstracted form of the identification system 170 as may be implemented between the vehicle 100 and another system, such as a cloud-computing environment. In addition, the identification system 170 and alignment module 220 generally include instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the identification system 170, in one embodiment, acquires sensor data 250 that includes at least camera images. In further arrangements, the identification system 170 acquires the sensor data 250 from further sensors such as radar sensors 123, LIDAR sensors 124, and other sensors as may be suitable for identifying vehicles, locations of the vehicles, and object locations.

Accordingly, the identification system 170, in one embodiment, controls the respective sensors to provide the data inputs in the form of the sensor data 250. Additionally, while the identification system 170 is discussed as controlling the various sensors to provide the sensor data 250, in one or more embodiments, the identification system 170 can employ other techniques to acquire the sensor data 250 that are either active or passive. For example, the identification system 170 may passively sniff the sensor data 250 from a stream of electronic information provided by the various sensors to further components within the vehicle 100. Moreover, the identification system 170 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In addition to locations of surrounding vehicles and objects, the sensor data 250 may also include, for example, information about lane markings, and so on that assist with estimating landmark positions. In alternative embodiments, the identification system 170 acquires the sensor data 250 about a forward direction when, for example, the vehicle 100 is not equipped with further sensors to include additional regions about the vehicle and/or the additional regions are not scanned due to other reasons.

Moreover, in one embodiment, the identification system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the alignment module 220 in executing various functions. In one embodiment, the data store 230 includes the sensor data 250 along with, for example, metadata that characterize various aspects of the sensor data 250. For example, the metadata can include position coordinates (e.g., longitude and latitude), relative map coordinates or tile identifiers, time/date stamps from when the separate sensor data 250 was generated, and so on. In one embodiment, the data store 230 further includes the template 240. For example, a template is a plot, an image, etc. having estimated positions, spatial relationships, features, and shapes of objects, such as landmarks within a scene. The template 240 may sometimes be referenced as a spatial template or prototype template having characteristic features, parameters, etc. shape information about various objects within a scene. Shape information can define representative contours and edges of objects and landmarks.

In one approach, the identification system 170 uses a machine learning algorithm to identify landmark and vehicle locations from the sensor data 250 and generate the template 240 accordingly. For example, a learning model is a vision and localization network, a simultaneous localization and mapping (SLAM) network, a neural network (NN), a convolutional NN (CNN), etc. The learning model can perform semantic segmentation over the sensor data 250 from which further information is derived for object locations. Of course, in further aspects, the identification system 170 may employ different machine learning algorithms or implement different approaches for performing the associated functions, which can include deep convolutional encoder-decoder architectures, or another suitable approach that generates semantic labels for the separate object classes represented in the image. Whichever particular approach the identification system 170 implements, the learning model generates an output with semantic labels identifying objects represented in the sensor data 250. In this way, the identification system 170 can form a trace dataset for multiple vehicles from landmark and vehicle locations identified using the learning model with the semantic labels describing a driving scene for various tasks (e.g., automated driving).

The vehicle 100, in one embodiment, acquires images from the one or more cameras 126 that a NN processes to recognize a landmark(s) within an area. In particular, a detection scheme may localize these landmarks "on the end" (e.g., the vehicle 100) by fusing an output from the NN with positioning data (e.g., a global positioning system (GPS) data) and inertial data. One or more vehicle(s) 100 may transmit a localized landmark(s), landmark locations, vehicle locations, and other data over the network interface 180 representing traces for a cloud server, a server, etc. to store and further process. In the cloud server, the identification system 170 can map and match a trace associated with edges in a road-graph that represents vehicle travel between nodes (e.g., road intersections). A template is formed from the trace associated with an observed landmark(s) and related locations among a coordinate space that is relative and associated with the edges. For example, the coordinate space represents landmark locations as a distance along an edge and a distance offset from the edge rather than latitude and longitude coordinates.

Moreover, the identification system 170 can generate a mass for a landmark(s) within a template and virtually connect the landmark(s) within the template using a virtual spring(s). In one approach, the alignment module 220 loads one or more templates for alignment between traces, such as through physical simulation. Masses for similar types of landmarks form attractions that mimic gravity, magnets, etc.

and deform during the simulation. For example, the position of a stop sign in one template will deform by moving towards a stop sign in another template. The springs connecting the masses within individual templates can attempt to maintain an original length while stretching and compressing, thereby preserving spatial relationships between landmarks observed through the traces. The alignment module 220 completes adjustments when a landmark(s) settles, such as when a mass ceases moving. Furthermore, the identification system 170 can control settlement rates by adjusting simulated friction. In this way, the identification system 170 aligns and positions landmarks within a driving scene efficiently and accurately, thereby improving navigation.

Figure 3:
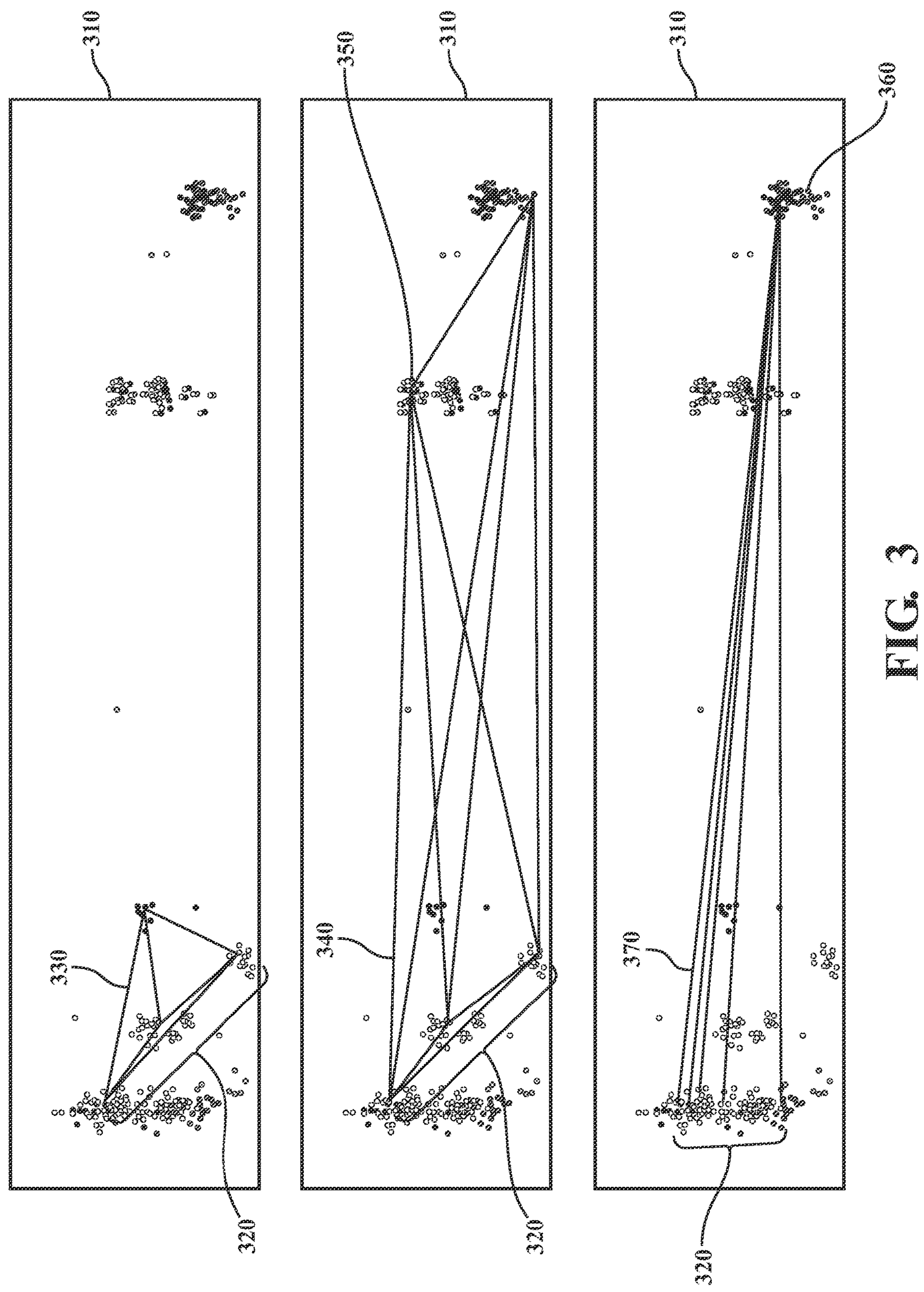
FIG. 3 illustrates an example of the identification system deforming the spatial template having landmarks located and positioned using trace data.

Now referring to FIG. 3, an example of the identification system 170 deforming a spatial template 310 having landmarks located and positioned using trace data is illustrated. In the present examples, location may be the relative presence between landmarks while position is a geographic presence of a landmark that is absolute. However, in other examples, the location can be a geographic presence between landmarks while position serves as the relative presence depending upon implementations. In addition, for example, the identification system 170 includes instructions that cause the processor 110 to form a trace dataset for multiple vehicles from landmark and vehicle locations identified with the sensor data 250 by a learning model (e.g., a vision and localization network). Here, the sensor data 250 may include local data acquired by the vehicle 100 and the trace dataset acquired from multiple vehicles over a communication link with the network interface 180 (e.g., a wireless transceiver, a wireless protocol, etc.). The trace dataset can include multiple traces where a trace can be associated with a vehicle for one or more trips and includes landmark locations from a certain view, timeframe, etc. As previously described, landmark positions estimated by a vehicle and captured within a trace will vary due to signal noise, vehicle motion, missing data, misaligned data, etc. that make landmark positions appear spatially shifted. For instance, multiple vehicles identify the positions of five stop signs along a road and capture the positions within different traces. In one approach, traces include keypoints associated with object features within a scene derived from sensor data. Although they are the same stop signs, the traces identify different positions with slight but significant offsets. As such, downstream tasks (e.g., automated driving) relying upon the traces and landmark positions that are sensitive face reliability losses, thereby demanding adjustments.

Moreover, the identification system 170 generates the spatial template 310 on the vehicle 100 using the trace dataset having missing data by associating information through data movement and augmentation. For example, the identification system 170 uses the adaptable links 330 to associate the landmarks 320 and form connections while maintaining spatial relationships, temporal relationships, relative locations, etc. An example of a spatial relationship is that a stop sign is next to a traffic light that is near a fire hydrant within the spatial template 310. Furthermore, the landmarks 320 can be associated spatially and logically according to type, shape, color, relative location, etc. For instance, landmarks having similar types (e.g., fire hydrant and mailbox) are probabilistically attracted to each other and the spring model moves these landmarks closer within a certain spatial range accordingly.

Upon generating the spatial template 310, the alignment module 220 aligns the landmarks 320 for positioning by deforming the spatial template 310 using a spring model. In particular, the spring model can fill in missing data and correct misaligned data. In one approach, the spring model executes a set of probabilistic transformations to estimate the elasticity and dynamics of landmark locations within the spatial template 310. For example, the links 340 act as virtual springs that deform (e.g., compress, expand, twist, etc.) in multiple dimensions while maintaining spatial and temporal relationships. The virtual springs can have a certain degree of movement in multiple dimensions, thereby allowing alignment adjustments. Correspondingly, data about the same and different landmarks 320, objects 350 (e.g., pedestrians, sidewalks, etc.), and additional landmarks 360 are accurately associated, thereby improving alignment.

Deformation may have probabilistic parameters (e.g., angle ranges) and a distance range (e.g., 5 centimeters (cm)) that maintains spatial relationships, such as between the objects 350 and the additional landmarks 360. As such, objects or features within a template move in a controlled and natural manner, thereby preventing erroneous deformations from shifting. Furthermore, the identification system 170 can acquire additional trace datasets as multiple vehicles move and update the spatial template 310 so that the alignment module 220 dynamically adapts and continues the deformation until attaining alignment of the landmarks 320. In another approach, the deformation continues until landmarks within the trace dataset that are attracted "snap" and align together through an overlap within a threshold amount. While landmarks that are attracted move into natural positions, relational probabilities of other landmarks may increase. This allows the identification system 170 to efficiently and accurately find the positions of the additional landmarks 360 with the increased probabilities and determine relationships with the objects 350.

Still referring to FIG. 3, the alignment module 220 may align the landmarks 320 and the additional landmarks 360 by deforming through relating locations using the connections 370 with the spring model across the trace dataset. Here, a trace from the trace dataset is associated with one of the multiple vehicles. In one approach, the trace includes keypoints of object features within a scene derived from the sensor data 250. A trace can be associated with a vehicle for one or more trips and include landmark positions from a certain view, timepoint, timeframe, etc. Upon relating positions, the alignment module 220 can move the landmark locations within a distance range by the spring model to fill missing data within the spatial template 310 and increase alignment. As a further enhancement, the alignment module 220 can selectively combine and group data from the trace dataset according to probabilities, type, and spatial correlations, thereby improving alignment and positioning across the trace dataset for landmarks within the spatial template 310 while maintaining relationships.

Additionally, the alignment module 220 relating positions of the landmarks can include combining the trace dataset completely into the spatial template 310 so that missing data is filled. For example, the identification system 170 clusters landmarks from the trace dataset upon alignment completion and landmarks settling into respective positions. The alignment module 220 may compute the position of a landmark as the average of observed locations within a cluster. In this way, the identification system 170 may improve probabilistic computations through integrating available data and adapting existing discrepancies (e.g., view offsets, sensor errors, etc.). Once the trace dataset is combined, the spring model may connect the landmarks 320 and the additional landmarks 360 according to type and trips. Landmarks of the same type from different traces are considered the same and associated with each other according to landmark parameters (e.g., shapes, profiles, features, etc.). For example, the identification system 170 groups landmarks having similar types from different trips, different types from different trips, etc. through the connections 370 and the landmark parameters. However, the identification system 170 chooses the closest and logical association (e.g., a standpipe near a building) if multiple are possible. In an alternative approach, the spring model connects the landmarks 320 and the additional landmarks 360 having different types from similar trips through the connections 370. As such, the identification system 170 improves the accuracy of landmark identifications and relationships by deforming a template using trace data that is diverse and robust from multiple vehicles, thereby increasing system reliability for tasks relying on landmark positions that are accurate.

Figure 4:
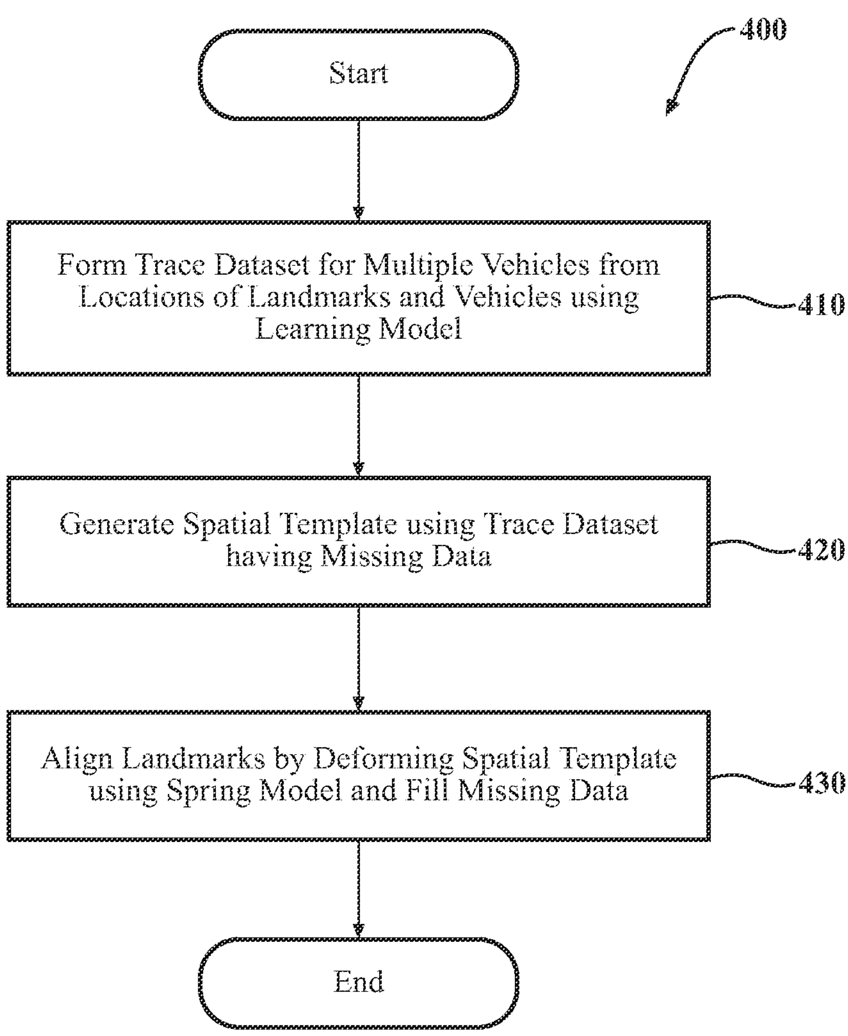
FIG. 4 illustrates one embodiment of a method that is associated with generating a spatial template using a trace dataset and aligning landmarks by deforming the spatial template.

Now turning to FIG. 4, a flowchart of a method 400 that is associated with generating a spatial template using a trace dataset and aligning landmarks by deforming the spatial template for positioning landmarks is illustrated. Method 400 will be discussed from the perspective of the identification system 170 of FIGS. 1 and 2. While method 400 is discussed in combination with the identification system 170, it should be appreciated that the method 400 is not limited to being implemented within the identification system 170 but is instead one example of a system that may implement the method 400.

At 410, the identification system 170 forms a trace dataset associated with multiple vehicles from the locations of landmarks and vehicles identified using a learning model. Here, the learning model can be a vision and localization network, a SLAM network, a NN, a CNN, etc. that executes perception computations (e.g., semantic segmentation) over sensor data for deriving landmark locations from a vehicle viewpoint. A trace is specific to a vehicle and formed from landmark locations and vehicle locations that are identified using the learning model with the sensor data and can include keypoints of object features derived from the sensor data. As previously explained, the identification system 170 can utilize outputs from the learning model identifying the locations to form a trace dataset for multiple vehicles, such as with the semantic labels describing a driving scene, and execute various tasks (e.g., automated driving). In one approach, the sensor data includes local data acquired by the vehicle 100 and the trace dataset acquired from multiple vehicles over a communication link with the network interface 180 (e.g., a wireless transceiver, a wireless protocol, etc.). Furthermore, the trace dataset can include multiple traces. A trace can be associated with a vehicle for one or more trips and include landmark locations from a certain view, timeframe, etc. However, landmark locations captured within a trace may vary due to signal noise, vehicle motion, missing data, misaligned data, etc. that makes landmark locations appear spatially shifted.

At 420, the identification system 170 generates a spatial template using the trace dataset having missing data. For example, the identification system 170 on the vehicle 100 associates information about landmarks through data movement and augmentation using the trace dataset. Associations may be discovered using adaptable links that form connections between landmarks while maintaining spatial relationships, temporal relationships, relative locations, etc. For instance, a spatial and a temporal relationship are police vehicles located near a stadium during a special event. As previously explained, the identification system 170 can associate landmarks spatially and logically according to type, shape, color, relative location, etc. As further explained below, landmarks having similar types (e.g., fire hydrant and mailbox) can be probabilistically attracted to each other. As such, a spring model can move these landmarks closer within a certain spatial range accordingly to improve alignment within the spatial template.

Now turning to 430, the alignment module 220 aligns landmarks by deforming a spatial template using a spring model and fills in missing data. Here, the spring model can fill in the missing data and correct misaligned data through probabilistic transformations to estimate the elasticity and dynamics of landmark locations associated with the spatial template. For example, the links or connections between landmarks act as virtual springs that deform (e.g., compress, expand, twist, etc.) in multiple dimensions having constraints and parameters while maintaining spatial and temporal relationships. In this way, the identification system 170 improves alignment with data about the same and different landmarks and objects (e.g., pedestrians, sidewalks, etc.) being accurately associated.

Moreover, deformation may have probabilistic parameters (e.g., angle ranges) and a distance range that maintains spatial relationships between landmarks. This translates to the alignment module 220 moving objects or features within a template having a controlled and natural manner that prevents erroneous deformations using radial parameters that are logical. Furthermore, the alignment module 220 can continue deformation until landmarks within the trace dataset that are attracted computationally fit through "snaping" and overlap alignment. As previously explained, relational probabilities of other landmarks can beneficially increase as landmarks that are attracted move into natural positions. In this way, the identification system 170 efficiently and accurately finds the positions of other landmarks with the increased probabilities and determines relationships with objects within the spatial template.

In various implementations, the alignment module 220 aligns landmarks and objects with the spring model across the trace dataset. Similar to other examples, a trace from the trace dataset is associated with one of the multiple vehicles for a trip(s) and includes landmark locations from a particular viewing angle, timepoint, timeframe, etc. Upon relating positions, the alignment module 220 can move the landmark locations within a distance range by the spring model to fill missing data within the spatial template and increase alignment. As such, the alignment module 220 can selectively combine and group data from the trace dataset according to probabilities, type, and spatial correlations, thereby efficiently improving alignment and positioning across the trace dataset for landmarks within the spatial template.

Figure 5:
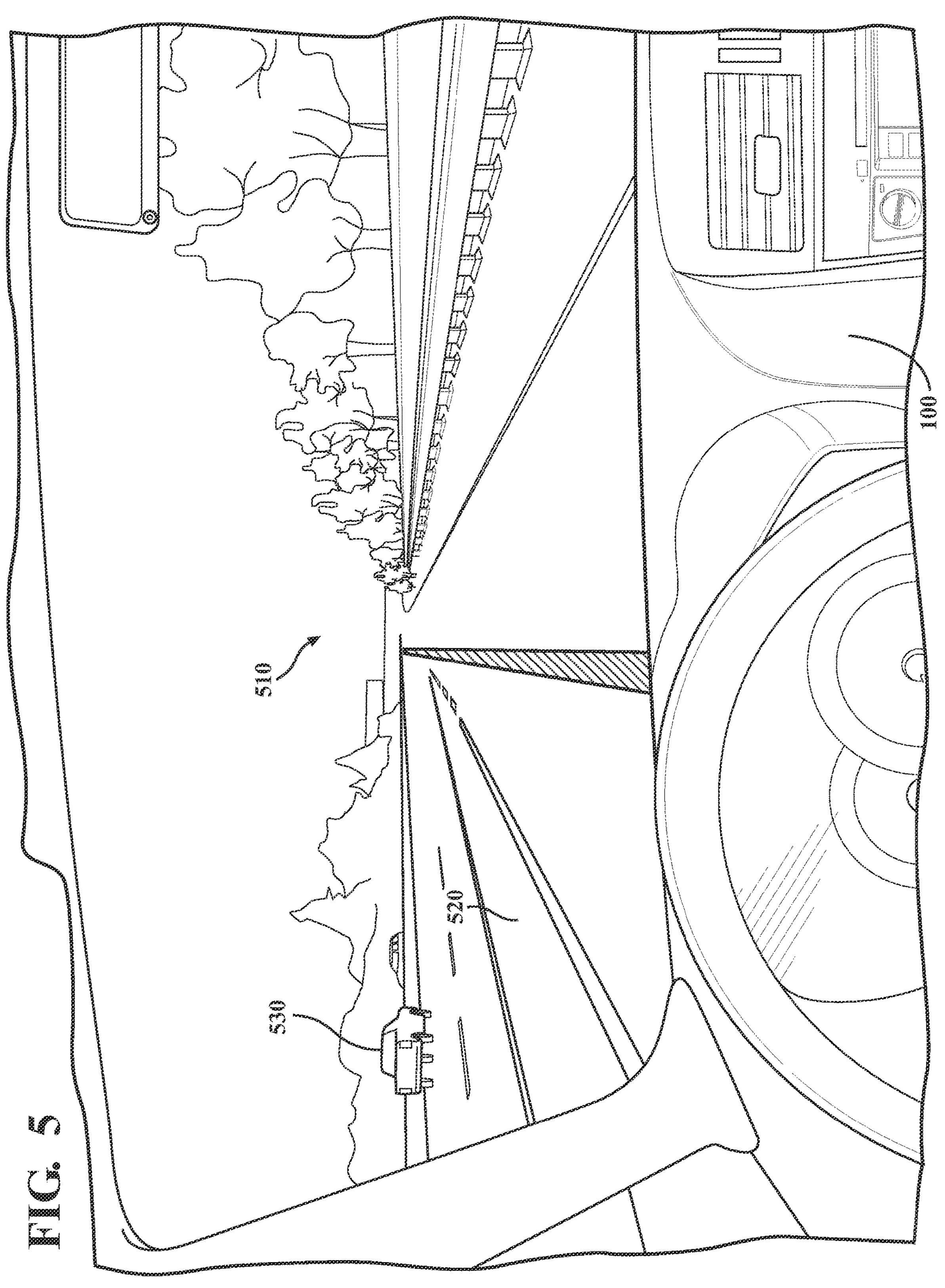
FIG. 5 illustrates a vehicle traveling within a driving environment using the identification system to accurately identify and position landmarks.

Now turning to FIG. 5, the vehicle 100 traveling within a driving environment 510 using the identification system 170 to accurately identify and position landmarks is illustrated. In FIG. 5, the vehicle 100 is traveling on the road 520 and forms a trace dataset using local sensor data and a trace at least received from the vehicle 530 over the network interface 180. A learning model (e.g., a NN) can process the sensor data of the vehicle 530 and form the trace having estimated landmark and vehicle locations within the driving environment 510. As such, the vehicle 100 forms the trace dataset having traces acquired from multiple vehicles to identify landmarks. Subsequently, the identification system 170 generates a spatial template using the trace dataset to estimate the shapes of the landmarks and improves the positioning of landmarks within the driving environment 510.

Moreover, the identification system 170 deforms (e.g., compresses, expands, twists, etc.) the spatial template in multiple dimensions using a spring model that fills the missing data, mitigates position discrepancies, and aligns landmarks through shifting locations between landmarks within the trace dataset. For example, the landmarks are connected and constrained with virtual springs having specified movement degrees in multiple dimensions that allow alignment adjustments. In this way, the identification system 170 accurately positions the landmarks by aligning the landmarks through deforming the spatial template while maintaining spatial, temporal, situational, etc. relationships. Accordingly, vehicles and systems can improve landmark positioning accuracy by generating and deforming a spatial template, thereby increasing vehicle performance and safety for systems that rely on accurate landmark positions.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic position of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the identification system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the identification system 170, and/or the automated driving module(s) 160 may control some or all of the vehicle systems 140 and, thus, may be partially or fully autonomous as defined by the society of automotive engineers (SAE) levels 0 to 5.

The processor(s) 110, the identification system 170, and/or the automated driving module(s) 160 can be operatively connected to communicate with the various vehicle systems 140 and/or individual components thereof. For example, the processor(s) 110, the identification system 170, and/or the automated driving module(s) 160 can be in communication to send and/or receive information from the various vehicle systems 140 to control the movement of the vehicle 100. The processor(s) 110, the identification system 170, and/or the automated driving module(s) 160 may control some or all of the vehicle systems 140.

The processor(s) 110, the identification system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the identification system 170, and/or the automated driving module(s) 160 can control the direction and/or speed of the vehicle 100. The processor(s) 110, the identification system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the identification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An identification system comprising:

a memory storing instructions that, when executed by a processor, cause the processor to:

form a trace dataset for multiple vehicles from locations of landmarks and vehicles identified with sensor data by a learning model, the sensor data associated with the multiple vehicles;

generate a spatial template by a vehicle using the trace dataset having missing data; and align the landmarks for positioning by deforming the spatial template using a spring model that fills the missing data.

2. The identification system of claim 1, wherein the instructions to align the landmarks for positioning by deforming further include instructions to:

relate the locations of the landmarks by the spring model across the trace dataset for the multiple vehicles, and a trace from the trace dataset is associated with one of the multiple vehicles; and move the locations of the landmarks within a distance range by the spring model to fill the missing data.

3. The identification system of claim 2, wherein the instructions to relate the locations of the landmarks further include instructions to:

combine the trace dataset completely into the spatial template; and connect by the spring model the landmarks having similar types from different trips for the multiple vehicles.

4. The identification system of claim 2, wherein the instructions to relate the locations of the landmarks further include instructions to:

connect by the spring model the landmarks having different types from similar trips for the multiple vehicles.

5. The identification system of claim 1 further including instructions to deform the spatial template by the spring model over time according to probabilistic parameters and a distance range that maintains spatial relationships between the landmarks.

6. The identification system of claim 1, wherein the spatial template is an estimate of an object shape.

7. The identification system of claim 1, wherein the spatial template defines representative contours and edges of the landmarks.

8. The identification system of claim 1, wherein the learning model is one of a vision and localization network, a simultaneous localization and mapping (SLAM) network, a neural network, and a deep neural network.

9. The identification system of claim 1, wherein the landmarks are one of obstacles, trees, traffic lights, stop signs, and buildings.

10. A non-transitory computer-readable medium comprising:

instructions that when executed by a processor cause the processor to:

form a trace dataset for multiple vehicles from locations of landmarks and vehicles identified with sensor data by a learning model, the sensor data associated with the multiple vehicles;

generate a spatial template by a vehicle using the trace dataset having missing data; and align the landmarks for positioning by deforming the spatial template using a spring model that fills the missing data.

11. The non-transitory computer-readable medium of claim 10, wherein the instructions to align the landmarks for positioning by deforming further include instructions to:

relate the locations of the landmarks by the spring model across the trace dataset for the multiple vehicles, and a trace from the trace dataset is associated with one of the multiple vehicles; and move the locations of the landmarks within a distance range by the spring model to fill the missing data.

12. A method comprising:

forming a trace dataset for multiple vehicles from locations of landmarks and vehicles identified with sensor data by a learning model, the sensor data associated with the multiple vehicles;

generating a spatial template by a vehicle using the trace dataset having missing data; and aligning the landmarks for positioning by deforming the spatial template using a spring model that fills the missing data.

13. The method of claim 12, wherein aligning the landmarks for positioning by deforming further includes:

relating the locations of the landmarks by the spring model across the trace dataset for the multiple vehicles, and a trace from the trace dataset is associated with one of the multiple vehicles; and moving the locations of the landmarks within a distance range by the spring model to fill the missing data.

14. The method of claim 13, wherein relating the locations of the landmarks further includes:

combining the trace dataset completely into the spatial template; and connecting by the spring model the landmarks having similar types from different trips for the multiple vehicles.

15. The method of claim 13, wherein relating the locations of the landmarks further includes connecting by the spring model the landmarks having different types from similar trips for the multiple vehicles.

16. The method of claim 12 further comprising deforming the spatial template by the spring model over time according to probabilistic parameters and a distance range that maintains spatial relationships between the landmarks.

17. The method of claim 12, wherein the spatial template is an estimate of an object shape.

18. The method of claim 12, wherein the spatial template defines representative contours and edges of the landmarks.

19. The method of claim 12, wherein the learning model is one of a vision and localization network, a simultaneous localization and mapping (SLAM) network, a neural network, and a deep neural network.

20. The method of claim 12, wherein the landmarks are one of obstacles, trees, traffic lights, stop signs, and buildings.

* * * * *